United States Patent

[11] 3,589,438

[72] Inventors: Colin Boorman, Altringham; Colin Betts, Hale, both of, England
[21] Appl. No.: 817,329
[22] Filed: Apr. 18, 1969
[45] Patented: June 29, 1971
[73] Assignee: United Kingdom Atomic Energy Authority, London, England
[32] Priority: Nov. 23, 1965
[33] Great Britain
[31] 49744/65
Continuation of application Ser. No. 594,168, Nov. 14, 1966, now Patent No. 3,439,737, dated Apr., 1969.

[54] SPACER GRID FOR HEAT EXCHANGE ELEMENTS WITH EDDY DIFFUSION PROMOTION MEANS
1 Claim, 4 Drawing Figs.
[52] U.S. Cl. .................................................. 165/109, 165/162, 165/172, 176/76, 176/78
[51] Int. Cl. .................................................. F28f 13/12, F28f 9/24, G21c 3/34
[50] Field of Search .................................... 165/109, 162, 172, 178; 176/76, 78

[56] References Cited
UNITED STATES PATENTS

| 3,344,855 | 10/1967 | Clark | 176/78 X |
| 3,356,582 | 12/1967 | Saunders | 176/76 X |
| 3,395,077 | 7/1968 | Tong et al. | 176/78 |
| 3,439,737 | 4/1969 | Boorman et al. | 167/109 |

FOREIGN PATENTS

| 1,085,976 | 7/1960 | Germany | 176/78 |

Primary Examiner—Albert W. Davis, Jr.
Attorney—Larson and Taylor

ABSTRACT: A spacer grid of cellular form for an assembly of elongate heat exchange elements has projections in each cell for locating the elements. The cell defining walls of the grid have irregular edges on one side of the grid for promoting eddy diffusion in coolant passing through the grid. The irregular edges may be formed by sections defined by slits or incisions in the edges and deformed out of the planes of the cell-defining grid walls.

SPACER GRID FOR HEAT EXCHANGE ELEMENTS WITH EDDY DIFFUSION PROMOTION MEANS

CROSS-REFERENCE TO RELATED APPLICATION

This application is a continuing application of application Ser. No. 594,168, filed Nov. 14, 1966 now U.S. Pat. No. 3,439,737, dated Apr. 22, 1969.

BACKGROUND OF THE INVENTION

This invention relates to assemblies of heat exchange elements and is particularly applicable to nuclear reactor fuel assemblies such as comprise a plurality of fuel rods clustered in spaced array.

In a nuclear reactor fuel assembly of the kind mentioned above the fuel rods are usually end supported and spaced one from another at intervals along their length by transverse spacer grids. Previously proposed spacer grids have been of cellular form, penetrated by the fuel rods, and designed to restrain radial deflection of the fuel rods. In use of such nuclear fuel assemblies in a nuclear reactor it is customary to cool the assemblies by means of a stream of coolant which passes longitudinally the fuel rods.

SUMMARY OF THE INVENTION

In accordance with the present invention, a spacer grid for an assembly of elongate heat exchange elements clustered in spaced array with individual axes parallel is of cellular form, and cells of the grid each have projections which are adapted to engage, and thereby locate, an elongate heat exchange element extending through the cell, and an irregular edge provided on one side of the grid for promoting eddy diffusion in coolant passing through the grid. The irregular edge may comprise sections of cell wall which are defined by incisions and deformed out of the plane of the wall.

The arrangement provides for efficient heat transfer between the elements and coolant through the promotion of turbulence by eddy diffusion in the coolant flow stream. The deformed edge or edges may be on the downstream side of the grid relative to the direction of coolant flow through the assembly, thus promoting eddy diffusion in the flow stream leaving the grids. Whereas coolant flow through a nuclear fuel assembly with a conventional cellular spacer grid tends to be in channels between and defined by the fuel rods, the turbulence by eddy diffusion which is promoted by the spacer grid of the instant invention is considered advantageous from the point of view of heat transfer considerations in that it helps reduce hot channel factors arising from geometrical tolerances and local fuel element variations, and also helps reduce coolant outlet temperature gradients arising from heat flux gradients in the assembly, without a prohibitive increase in the pressure drop experienced by the coolant. Although not necessarily, the locating projections may be shaped and arranged so as to impart to the coolant flow stream a rotational component of flow.

DESCRIPTION OF THE PREFERRED EMBODIMENT

Figure 1:
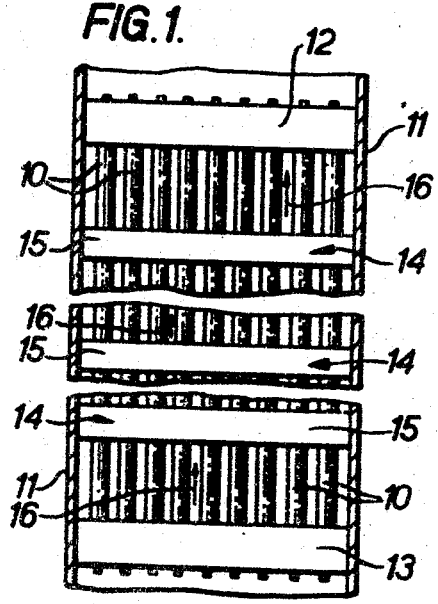
FIG. 1 is a part-sectional elevation of a nuclear reactor fuel assembly in accordance with the invention.

FIG. 1 shows a nuclear reactor fuel assembly comprising a plurality of elongate fuel rods 10 clustered in spaced array with their longitudinal axes parallel within a casing or wrapper 11 of hexagonal cross section. The fuel rods 10 are supported at their upper ends by an apertured upper support plate 12 secured to the wrapper 11. At their lower ends the fuel rods 10 are located against lateral displacement by an apertured lower locating plate 13, thus allowing for linear thermal expansion of the rods 10. The fuel rods 10 are spaced one from another at intervals along their length by transverse spacer grids 14 penetrated by the rods 10 and secured to the wrapper 11. The grids 14 are of cellular form, each comprising an outer hexagonal frame 15 secured to the wrapper 11. In use of the illustrated fuel assembly in a nuclear reactor the fuel rods 10 are cooled by a stream of coolant which passes longitudinally over the rods, as indicated by arrows 16.

Figure 2:
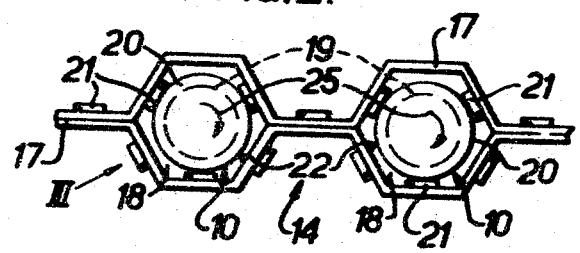
FIG. 2 is an enlarged plan view of a part of FIG. 1.

FIG. 2 shows strips 17 of hexagonal-meander shape which are joined together to define hexagonal cells 18 forming a cell structure of one of the spacer grids 14, it being understood that the strips 17 are joined at their ends to one of the frames 15 shown in FIG. 1. Each cell 18 is penetrated by one fuel rod 10 containing fissile material 19 such as, for example, a mixture of uranium and plutonium oxides enclosed in a plain tubular sheath 20 constructed of stainless steel.

Figure 3:
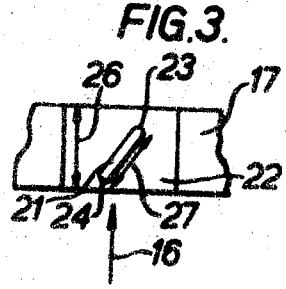
FIG. 3 is a fragmentary view in the direction of arrow III of FIG. 2.

Referring to FIG. 3 in conjunction with FIG. 2, the strips 17 are formed with projections 21 so that each cell 18 has three such projections 21 directed inwardly into it and disposed on alternate ones of its six walls 22. In contrast to conventional cellular spacer grids having projections of circular form (often referred to as dimples), the projections 21, in their illustrated form, are elongated and are inclined with respect to the axis of the fuel rod engaged thereby. In other words, each of the projections 21 slopes in extending from a lower to an upper region of its wall 22. Each of the projections 21 has rounded upper and lower ends 23, 24, respectively, and is symmetrically disposed with respect to its wall 22. In each cell 18 the three projections 21 are similarly orientated, and the fuel rod 10 penetrating that cell is located by point contact of its unribbed sheath 20 with the projections 21 at these circumferentially equispaced positions.

Figure 4:
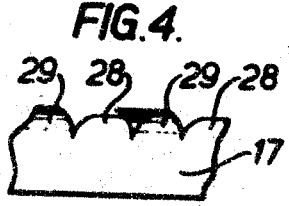
FIG. 4 is a fragmentary view exemplifying a portion of the grid material formed with an irregular edge provided on one side of the grid in accordance with one embodiment of the invention.

To cause and enhance mixing of coolant, turbulence by eddy diffusion is promoted in the coolant flow stream by an irregular edge provided on one side of the grid. An exemplary structure for accomplishing this purpose is shown in FIG. 4, which illustrates the upper edge of one of the strips 17 (that is to say the downstream edge relative to the direction of coolant flow through the assembly) as being made irregular by having sections 28 curved in one direction (toward but clear of one of the fuel rods), alternating with sections 29 curved in the opposite direction (away from but clear of the fuel rod), the sections being defined by vertical slits or incisions in the upper edge.

In operation, coolant flowing upwardly as indicated by the arrows 16 is deflected by the projections 21 and the edge sections 28 and 29, and thus has imparted to it in each cell 18 a rotational component of flow as indicated by arrows 25, as well as turbulence in the form of eddy diffusion in the flow stream leaving the grids 14. In this way the projections and the irregular edge sections promote coolant swirling or mixing in the coolant flow stream passing through the grids 14, which is considered advantageous for the reasons given above. The strips are arranged edge on to the coolant flow through the assembly, and the pressure drop experienced by the coolant is not prohibitively increased as compared with conventional spacer grids.

The components 11 to 14 are typically constructed from stainless steel, and the projections 21 are conveniently formed by stamping or slotting of the strips 17. Purely by way of illustration, mention is made that for a depth D of spacer grid as represented by arrow 26 in FIG. 3, the projections 21 typically may have a length of D/2 as represented by arrow 27 in FIG. 3 and be disposed at an angle of 20° as represented by the included angle between the arrows 26, 27. The irregular edge as illustrated in FIG. 4 is, of course, formed by the sections 28 and 29 being deformed out of the plane of the wall, the sections being defined by vertical slits or incisions in the edge Thus, fabrication of the improved spacer grid poses no problems.

We claim:

1. A spacer grid for an assembly of elongate heat exchange elements clustered in spaced array with individual axes parallel, the grid having cells bounded by joined strips within a peripheral frame, each cell having projections which are adapted to engage, and thereby locate, an elongate heat exchange element extending through the cell, the grid having an irregular edge on one face side for promoting eddy diffusion in coolant passing through the grid, said irregular edge comprising side-by-side sections defined by slits extending from one edge of the joined strips and said sections being deformed out of the plane of said face side of the grid alternately in opposite directions.